United States Patent [19]
Blenkush

[11] Patent Number: 4,630,847
[45] Date of Patent: Dec. 23, 1986

[54] MULTIPLE TUBE CONNECTOR

[75] Inventor: Brian J. Blenkush, Maple Grove, Minn.

[73] Assignee: Colder Products Company, St. Paul, Minn.

[21] Appl. No.: 658,271

[22] Filed: Oct. 5, 1984

[51] Int. Cl.$^4$ .............................................. F16L 39/00
[52] U.S. Cl. .................... 285/29; 285/137.1; 285/347; 285/362; 285/331; 285/242; 285/921
[58] Field of Search .................... 285/137 R, 360, 361, 285/362, 376, 331, 305, 308, 401, 402, 26, 29, 423, 137.1

[56] References Cited

U.S. PATENT DOCUMENTS

| | | | |
|---|---|---|---|
| 1,019,558 | 3/1912 | Thompson | 285/362 |
| 3,179,444 | 4/1965 | Lansky et al. | 285/308 |
| 3,381,977 | 5/1968 | Metzger | 285/331 |
| 3,960,393 | 6/1976 | Hosokawa et al. | 285/137 R |
| 4,026,581 | 5/1977 | Pasbrig | 285/331 |
| 4,076,279 | 2/1978 | Klotz et al. | 285/305 |
| 4,225,162 | 9/1980 | Dola | 285/331 |

FOREIGN PATENT DOCUMENTS

| | | | |
|---|---|---|---|
| 1372566 | 8/1964 | France | 285/308 |
| 2276768 | 6/1974 | France | 285/137 R |
| 472624 | 6/1969 | Switzerland | 285/137 R |

OTHER PUBLICATIONS

8 color photographs, labelled Exhibits A through H, showing the prior art disclosed in the Information Disclosure Statement submitted herewith.
3 Photographs (labelled A, B, and C) of Festo Multi Tube Connector.

Primary Examiner—Cornelius J. Husar
Assistant Examiner—Anthony Knight
Attorney, Agent, or Firm—Merchant, Gould, Smith, Edell, Welter & Schmidt

[57] ABSTRACT

The present invention relates to a multiple tube connector (60). The multiple tube connector (60) includes two substantially identical first and second connector housings (62, 64). The first and second connector housings (62, 64) include an aperture (65) coaxially positioned therein. The aperture (65) includes a plurality of inwardly projecting, evenly spaced apart and substantially identical splines (88) defining key ways (90) therebetween. A locking spindle (66) is rotatably mounted in one of the first and second connector housings (62, 64). The locking spindle (66) includes evenly spaced apart, outwardly projecting and substantially identical splines (92) defining key ways (96) therebetween. The locking spindle (66) being rotatable between a released position wherein the splines (92) of the locking spindle (66) are aligned with the key ways (90) of the first and second connector housings (62, 64) such that the first and second connector housings (62, 64) can be placed in an abutting relationship and a locked position wherein the splines (92) of the locking spindle (66) are aligned with the splines (88) of the first and second connector housings (62, 64) such that the connector housings (62, 64) are locked in an abutting relationship.

22 Claims, 13 Drawing Figures

MULTIPLE TUBE CONNECTOR

BACKGROUND OF THE INVENTION

The present invention relates to a multiple tube connector for simultaneously interconnecting a plurality of tubes. More particularly, the present invention relates to a multiple tube connector including a positive, quick action lock/release mechanism having a self-alignment feature insuring proper interconnection of the individual tubes.

Many applications require numerous tubes or other suitable conduits for conveying fluids and the like. For example, in robotics numerous tubes or conduits are required to provide the necessary control and operation of the multiplicity of movements involved. In medical offices wherein numerous tools are used, there is a need for a multiplicity of tubes carrying the various control and operating fluids to each of the individual tools. Regardless of the application, it is oftentimes very desirable to be able to simultaneously disconnect or connect a multiplicity of the individual tubes for servicing and replacement.

Figure 1:
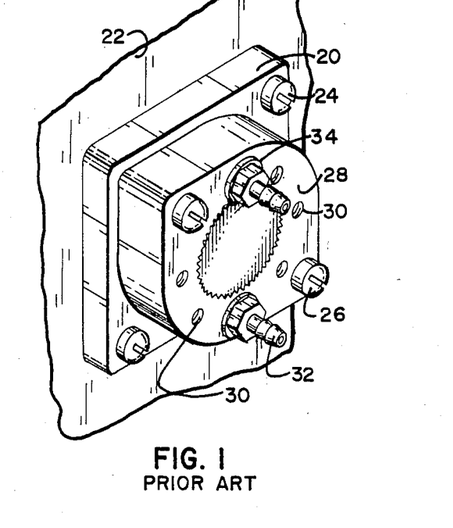
FIG. 1 is a view in perspective of a prior art multiple tube connector suitably mounted on a panel structure.
Figure 2:
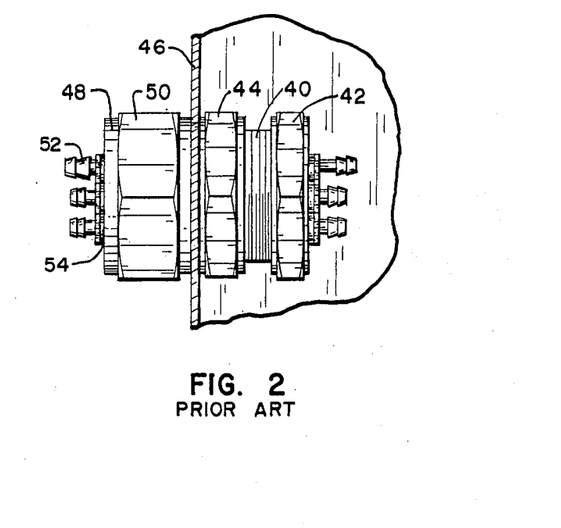
FIG. 2 is a view in perspective of yet another embodiment of a multiple tube connector mounted on a panel structure.

As a result of this need, multiple tube connectors have been developed, two examples of which are shown in FIGS. 1 and 2 of the application. Multiple tube connectors usually employ at least two housing portions having paths for the flow of fluid therethrough which are suitably connected to the ends of the tubing and then interconnected to one another so as to provide fluid communication between the two sets of tubing. Oftentimes, one of the housing portions is mounted on a panel. There are several problems noted with currently existing multiple tube connectors. For example, most multiple tube connectors utilize a threaded fastener to connect the two housing portions. As there must be an appropriate fluid tight seal between the housing portions, the threaded fasteners must be properly tightened. Depending on the person tightening the fasteners and/or the tools available, the degree to which the housings are tightened will vary substantially. In addition, individual tubing inserts are threaded into threaded apertures of the housing portions and are then individually inserted into the ends of their respective tubing. Further, a seal must be provided for each of the threaded inserts, also resulting in a varying degree of tightness. In addition, oftentimes the seals are not self-retaining and are easily lost. From the above discussion, it is clear that the currently available mutliple tube connectors are difficult and combersome to use. Another drawback is that they are usually made from two dissimiliar pieces, which results in increased manufacturing cost. Also, most of the multiple tube connectors currently available have at least one housing portion which is made from metal.

The present invention solves these and many other problems associated with currently existing multiple tube connectors.

SUMMARY OF THE INVENTION

The present invention relates to a multiple tube connector. The multiple tube connector includes a first cylindrical connector housing having an axially extending, outer rim portion interconnected to a transversely extending wall portion. The wall portion has an aperture substantially coaxial with respect to the rim portion. A plurality of apertures of lesser diameter than the coaxial aperture are disposed in the wall portion circumferentially about a major portion of the coaxial aperture. The coaxial aperture includes a plurality of inwardly projecting, evenly spaced apart and substantially identical spline members. The spline members define a plurality of axially extending key ways therebetween. The multiple tube connector includes a second cylindrical connector housing substantially identical to the first connector housing. A plurality of axially extending male and female inserts are removably positioned in at least some of the apertures of lesser diameter in the first and second connector housings. A first end of the female inserts in adapted to releasably receive a first end of the cooperating male inserts when the first and second connector housings are placed in an abutting relationship. A second end of the male and female inserts is configured for insertion into the end of a tube. A cylindrical locking spindle is rotatably positioned and retained proximate a first end in the first connector housing. A locking spindle defines proximate a second end a plurality of evenly spaced apart, outwardly projecting and substantially identical spline, axially extending key ways being defined between the splines. Manually activated switch means interconnected to the locking spindle by a radially extending, elongated shaft is provided for rotating the locking spindle between a first released position and a second locked position. The splines of the locking spindle cooperate with the key ways of the second connector housing to enable partial insertion of the locking spindle through the coaxial aperture of the second connector housing when in the first released position such that the first and second connector housings are placed in abutting relationship. The splines of the locking spindle cooperate with the splines of the second connector housing to lock the first and second connector housings together in abutting relationship when in the second locked position. The elongated shaft interconnected to the locking spindle extends beyond the rim portions of the first and second connector housings. The rim portions of the first and second connector housings are cut away along a predetermined circumferential extent and the wall portions of the first and second connector housings being void of the apertures of lesser diameter along a corresponding extent so as to enable a predetermined amount of pivotal motion of the elongated shaft. The elongated shaft and the splines of the locking spindle cooperate with the second connector housing to provide proper alignment of the respective male and female inserts upon positioning of the first and second connector housings in abutting relationship.

In one embodiment of the present invention, the first and second connector housings are identical in structure and made from a moldable material, thereby substantially reducing manufacturing costs since a single mold can be used to make both housings. Further, the locking spindle can be rotatably positioned in either of the first or second connector housings and the inserts can be positioned in either of the connector housings. This provides the invention with substantial modularity and versatility as it can be readily assembled in a variety of configurations.

In yet another embodiment of the present invention, the male tubing inserts include a self-retaining seal. In one embodiment, this self-retaining seal is an "O" ring positioned about the first end of the male tubing insert.

A particular advantage of the present invention is that it does away with the necessity for any fluid tight seal between the first and second connector housings. The only fluid tight seal necessitated is that between the corresponding male and female tubing inserts. In one embodiment, these seals are replaceable.

Yet another advantageous feature of the present invention is that it occupies relatively little space.

In one embodiment, the male and female tubing inserts are snapped into position in the apertures of either of the first and second connector housings and provide for a certain amount of pivotal motion of the male and female tubing inserts so as to facilitate alignment of the individual inserts.

In the preferred embodiment, the male and female inserts are replaceable so that different sizes and combinations of inserts might be utilized. In addition, inserts made from different materials to accomodate handling of different fluids can also be used. Additionally, in the preferred embodiment, the inserts are made from moldable plastic materials which offer resistance to chemical corrosion.

In the preferred embodiment, yet another particularly advantageous feature is the ability to intermix the male and female inserts in the first and second connector housings to differentiate multiple connector housings from one another. For example, there may be multiple ones of the connector housings mounted on a panel. By intermixing the male and female inserts, each of the connector housings mounted on the panel can be provided with a unique keying configuration to assure that the proper connector housing will be interconnected thereto.

In the preferred embodiment, six splines are used so as to be spaced from one another by approximately 30 degrees. Accordingly, the elongated shaft of the switch means is provided with a 30 degree range of motion in switching from the locked to the released position.

A particularly advantageous feature of the present invention is the provision of a quick, simple to operate, positive interconnection with proper matching of the individual tubes being assured.

Yet another advantageous feature of one embodiment of the present invention is the presence of a radiused ridge on the rim portion of the connector housings which provides for a detent type action in releasably retaining the thumb pad of the switch mechanism in an open or closed position. In one embodiment, the thumb pad is simply snapped onto the elongated locking spindle shaft.

Yet another advantageous feature of the present invention is the provision of mounting lugs to enable mounting of the connector housings to a panel.

Still another advantageous feature of one embodiment of the present invention is the provision for attachment of a tubing shroud so as to surround the individual tubes and provide a shield therefor. A flexible tubing sheath extending along a major portion of the lengths of the tubes may be interconnected to the tubing shroud.

Another advantage of one embodiment of the present invention is the provision for a shroud providing strain relief for the individual tubes when a tensile force is applied.

Yet another advantageous feature of one embodiment of the present invention is the provision of a tubing insert which is provided with a shroud of one piece therewith so as to provide support for the barbed second end of the tubing insert such that the second end does not bend or kink.

Yet another advantageous feature of one embodiment of the present invention is the provision for proper balancing of the respective tubing members when under pressure due to the symmetrical nature of the connector.

Yet another advantage of one embodiment of the present invention is the provision for rotatable tubing inserts so as to eliminate torsional strain on the tubing.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof, and to the accompanying descriptive matter in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Referring now to the drawings, there is illustrated in FIGS. 1 and 2 examples of multiple tube connectors currently available in the marketplace. The first example shown in FIG. 1 is believed to be sold by Clippard Instrument Laboratory, in Cinncinnati, Ohio. As illustrated in FIG. 1, this multiple tube connector includes a first panel-mounted housing portion 20 threadedly attached to a panel structure 22 by two threaded screws 24. Threadedly attached to the first panel-mounted portion 20 by threaded screws 26 is a second portion 28. A plurality of threaded apertures 30 are positioned generally about the circumference of the second portion and the first panel-mounted portion (not shown) so as to provide for fluid communication through the first and second portions 20, 28 when properly aligned with one another. Proper alignment is assured by the presence of a splined shaft (not shown) disposed on the side of the second portion 28 which cooperates with a keyed aperture (not shown) in the first panel-mounted portion 20. Disposed intermediate of the first and second portions 20, 28 to provide a fluid tight seal therebetween is a rubber gasket (not shown) so as to provide a fluid tight seal between the first and second portions. As illustrated in FIG. 1, threadedly inserted into the apertures 30 are barbed metal tubing inserts 32 for insertion into the ends of the tubing (there being two inserts in the embodiment shown). Each of the tubing inserts 32 include a corresponding seal member 34 for providing a fluid tight seal between the insert and the housing portion. Although not shown, the back side of the first panel-mounted portion 20 similarly includes threaded tubing inserts and their respective seals. It will be appreciated that there are numerous problems with the design shown in FIG. 1. For example, the housing portions 20, 28 are dissimilar in structure, with the first portion being constructed from a metal and the second portion being constructed from what is believed to be a plastic material. Furthermore, in order to disconnect the tubing, the screws 24 must be unthreaded to separate the housing portions 20, 28. Furthermore, when connecting the tubing, the screws 24 must be tightened an appropriate amount. It is very difficult to assure uniform tightness when using a threaded fastener as a threaded fastener provides no memory function in the fastening process. Additionally, each of the tubing inserts 32 must be threaded into the apertures 30 so as to be sealed by their individual seal members 34. Once again, this results in variable tightness and possibly in an ineffective seal. Furthermore, the small size of the parts makes it awkward and difficult to threadedly connect the inserts. In addition, the seals are not self-retaining and thereby can be easily lost. It will be appreciated that, in general, usage of such a multiple tube connector is time consuming and cumbersome and frequently does not result in a positive seal.

Illustrated in FIG. 2 is yet another embodiment of a commercially available multiple tube connector. As illustrated, the multiple tube connector includes a threaded cylindrical portion 40 having an enlarged, six sided hexagonal head portion 42 at one end thereof. A threaded nut portion 44 is threaded onto the cylindrical portion 40 such that when the cylindrical portion 40 is inserted into the opening of a panel structure 46, the first nut portion 44 can be threaded so as to abut against the panel structure 46. Releasably positioned at an opposite end of the cylindrical portion 40 is a cylindrical adaptor member 48 which is retained at the end of the cylindrical portion 40 by a second nut portion 50 threaded onto the cylindrical portion 40. While not shown, both the adaptor member 48 and the cylindrical portion 40 include a plurality of apertures therein. Proper alignment or keying of the apertures is provided by use of a dual pin structure on the end of the cylindrical portion 40 and a corresponding dual aperture structure at the end of the adaptor member 48. As illustrated, threadedly inserted into the threaded apertures are metal tubing inserts 52. As with the previously discussed multiple tube connector, this connector must be threaded and unthreaded to connect and disconnect the multiple tubing arrangement. Further, seals 54 must be provided between the adaptor member 48 and the cylindrical portion 40 as well as at each of the individual tubing inserts 52. As with the multiple tube connector of FIG. 1, it does not provide for a quick acting connect-/disconnect and oftentimes does not result in a good positive seal. Further, the relatively small size of the individual tubing inserts makes it difficult to threadedly insert them into their respective apertures. Also, as with the multiple tube connector discussed previously, the individual seals of the tubing inserts can be readily lost.

Figure 3:
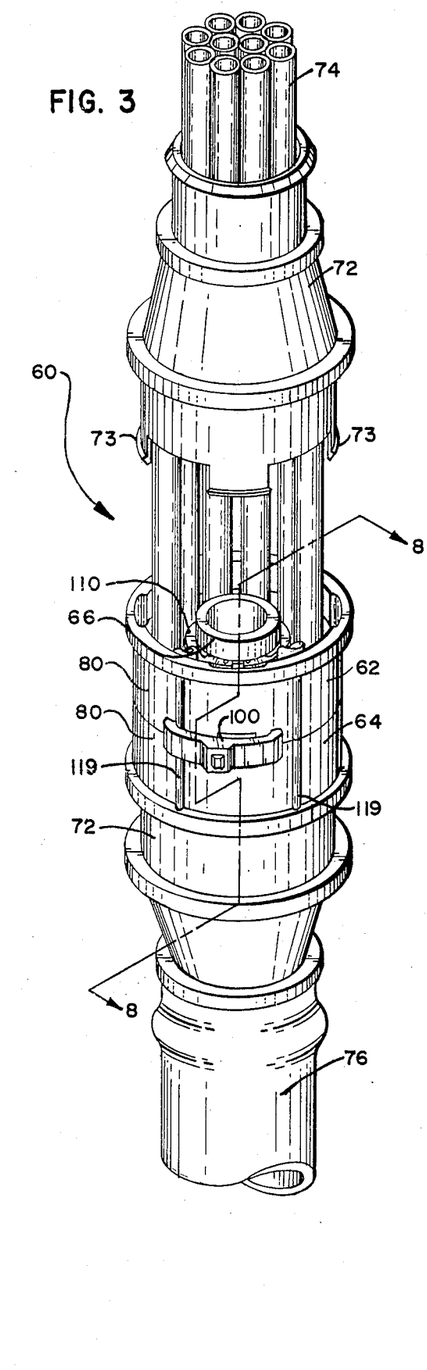
FIG. 3 is a perspective view of a preferred embodiment of the present invention with connector housings shown locked in abutting relationship and with a shroud member being partially removed to disclose the tubing interconnected to an end of a connector housing.
Figure 4:
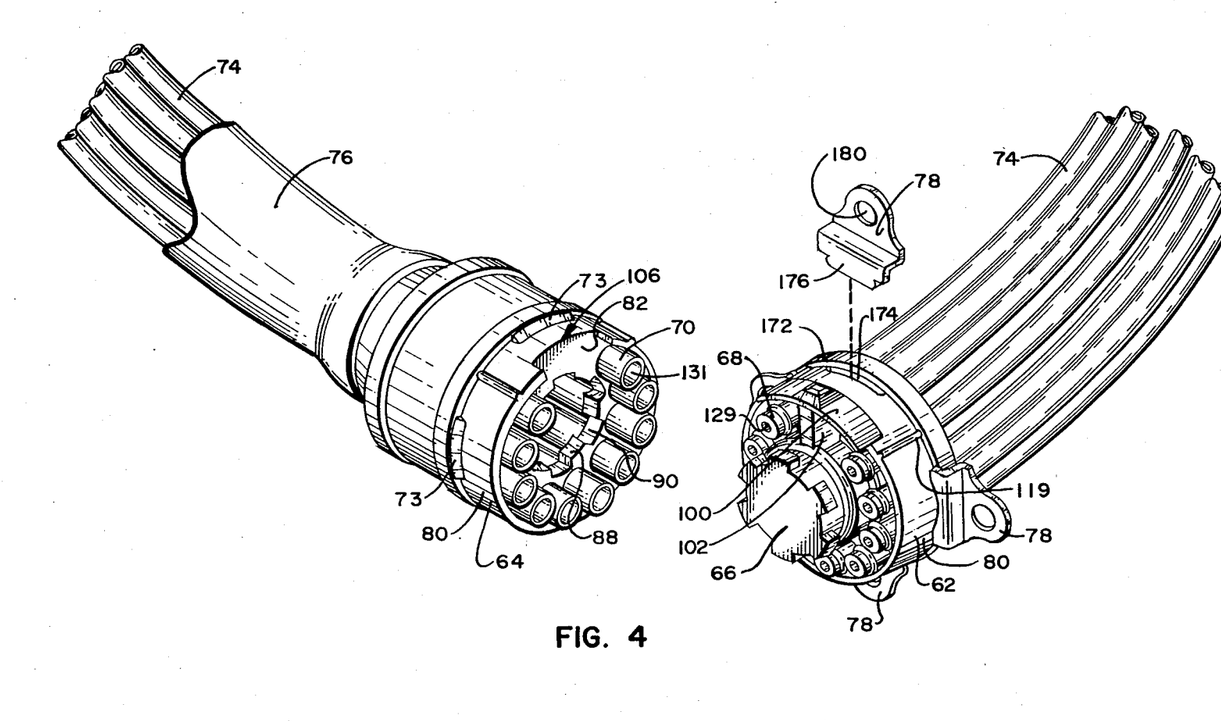
FIG. 4 is a view in perspective of a similar embodiment of the present invention with the connector housings being separated and with mounting lugs for mounting one of the connector housings on a panel structure being illustrated, one of the lugs being removed for sake of illustration.
Figures 5, 6, 7, 8:
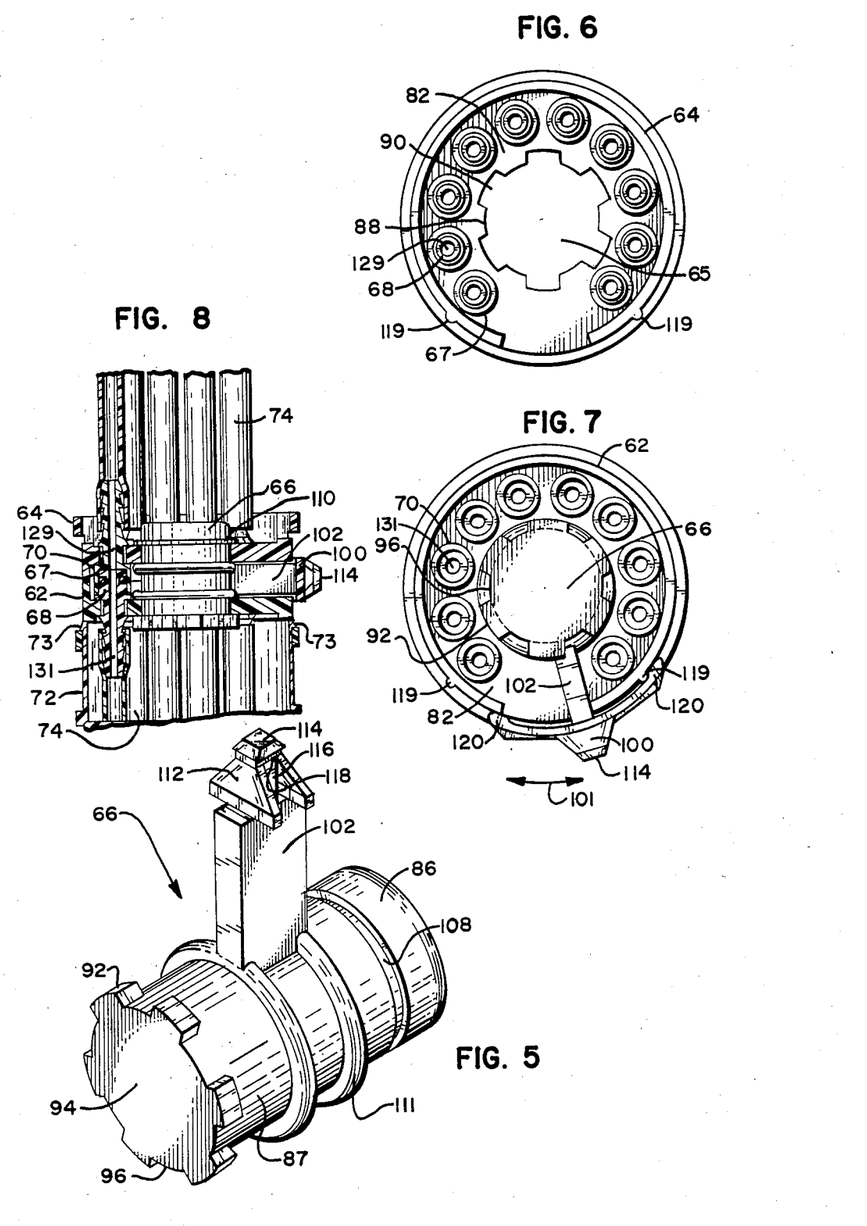
FIG. 5 is a perspective view of the locking spindle of the embodiments shown in FIGS. 3 and 4.
FIG. 6 is a front end elevational view of the second connector housing shown in FIG. 3 including male tubing inserts.
FIG. 7 is a front end elevational view of the first connector housing shown in FIG. 3 including female tubing inserts and the spindle illustrated in FIG. 5, the spindle being positioned in the locked position.
FIG. 8 is a partial sectional view generally along the line 8—8 of FIG. 3.

Illustrated in FIGS. 3 and 4 is a preferred embodiment of the multiple tube connector of the present invention, generally designated by the reference numeral 60. The preferred embodiment of the multiple tube connector 60 is illustrated as including substantially identical first and second connector housings 62, 64. As illustrated, the first connector housing 62 has a locking spindle member 66, an embodiment of which is illustrated in FIG. 5, rotatably mounted in an aperture 65. Although for sake of description the locking spindle 66 is described herein as being mounted in the first connector housing 62, it will be appreciated that the locking spindle member 66 might be rotatably mounted in the identical second connector housing 64. Furthermore, since the housings are substantially identical in the preferred embodiment shown, corresponding parts of the housings are designated hereby by the same reference numerals. As illustrated in FIG. 4, removably mounted in apertures 67 of first and second connector housings 62, 64 are a plurality of male and female tubing inserts 68, 70. As illustrated in FIG. 4, the removable male tubing inserts 68 are positioned in the first connector housing 62 while in FIGS. 3, 6 and 8 the male tubing inserts 68 are positioned in the second connector housing 62. Thus, it will be appreciated that the male and female tubing inserts 68, 70 are interchangeable between the first and second connector housings 62, 64 and may even be intermixed within a given connector housing. Preferably, the locking spindle 66, the first and second housings 62, 64 and the inserts 68, 70 are each of one piece construction and constructed from a moldable material.

As illustrated in FIGS. 3 and 4, an optional shroud member 72 might be utilized to provide protection for a plurality of tubes 74 interconnected to the male and female tubing inserts 68, 70. In addition, as illustrated in FIGS. 3 and 4, the shroud member 72 might also provide for attachment of a flexible sheath 76 enclosing the tubes 74. Although not shown, a cable tie or clamp arrangement might be used to attach the flexible sheath to the shroud member 72. The shroud member 72 provides strain relief for the individual tubes when a tensile force is applied to the sheath 76 such as by pulling on the sheath 76. As shown in FIG. 3, the shroud 72 is removed from the first connector housing 62 to disclose the tubes 74 adjacent the end of the first connector housing 62. As further illustrated in FIG. 4, optional mounting lugs 78 might be utilized to mount one of the connector housings onto a panel structure. As illustrated a shroud member will typically not be attached to the connector housing when mounted on a panel structure.

More particularly, as disclosed in FIGS. 3 through 7, each of the first and second connector housings 62, 64 include an axially extending rim portion 80 interconnected to a transversely extending wall portion 82 disposed intermediate of the ends of the rim portion 80. Positioned in the wall portion 82 coaxially with respect to the rim portion 80 is the aperture 65 which is adapted to rotatably receive a first end portion 86 of a cylindrical body portion 87 of the locking spindle 66. The coaxial aperture 65 includes a plurality of inwardly projecting, evenly spaced apart and substantially identical splines 88 defining axially extending keyways 90 therebetween. The keyways 90 are adapted for slidable receipt of outwardly projecting, evenly spaced apart and substantially identical splines 92 located at a second end portion 94 of the cylindrical body portion 87 of the locking spindle 66, the splines 92 of the locking spindle 66 similarly defining axially extending keyways 96 therebetween. In the preferred embodiment shown, the first and second connector housings 62, 64 and the locking spindle 66 each include six identical evenly spaced apart splines. The splines are spaced apart and have a width of approximately thirty degrees. Accordingly, in the embodiment shown, by aligning the splines 92 of the locking spindle 66 with the keyways 90 of the second connector housing 64, the splines 92 of the locking spindle 66 can be inserted through and past the coaxial aperture 65 in the second connector housing 64 such that the connector housings 62, 64 are in an abutting relationship as generally illustrated in FIG. 3 and the male and female tubing inserts 68, 70 are interconnected as further illustrated in FIG. 8 thereby providing for fluid communication through the connector housings 62, 64 when in such an abutting relationship. By simply rotating the locking spindle 66 thirty degrees by use of a thumb pad 100 interconnected to a radially extending elongated shaft 102 of the locking spindle 66, the splines 92 of the locking spindle 66 are aligned with the splines 88 of the second connector housing 64 so as to prohibit removal of the spindle 66 and thus lock the first and second connector housings 62, 64 in the abutting relationship generally shown in FIG. 3. Similarly, the first and second connector housings 62, 64 are readily separated by movement of the thumb pad 100 approximately thirty degrees in the opposite direction and pulling the connector housings, 62, 64 apart. The motion of the thumb pad 100 is generally illustrated by the arrow 101 of FIG. 7.

As illustrated in FIGS. 3 through 7, in the preferred embodiment, ten of the apertures 67 of lesser diameter than the coaxial aperture 65 are positioned circumferentially in the wall portion 82 about the coaxial aperture 65. The wall portion 82 does not include any of the apertures 67 about a circumferential extent of approximately thirty degrees. Correspondingly, the rim portion 80 of the connector housings 62, 64 is cut away along a circumferential extent 106 so as to provide a range of movement of the elongated shaft 102 of the locking spindle 66 of approximately thirty degrees whereby the locking spindle 66 may be rotated by movement of the elongated shaft 102 between a first released position wherein the splines 92 of the locking spindle 66 are aligned with the keyways 90 of the second housing connector 64 and a second locked position wherein the splines 92 of the locking spindle 66 are aligned with the splines 88 of the second housing connector 64.

As illustrated in FIGS. 3 and 5, the locking spindle of the preferred embodiment includes a circumferentially extending groove 108 about the cylindrical body portion 87 which provides for receipt of a metal snap ring 110. The snap ring 110 cooperated with a raised ridge 111 or the cylindrical body portion 87 to retain the locking spindle 66 in the first connector housing 62. The outer diameter of the cylindrical body portion 87 between the snap ring 110 and the raised ridge 111 being slightly less than the diameter of the opening formed by the inner ends of the splines 88 so that the spindle 66 is rotatably mounted therein.

As illustrated in FIGS. 5 and 8, the elongated shaft 102 of the locking spindle 66 preferably includes tapered side portions 112 configured similarly to that of the thumb pad 100 and a rectangular member 114 supported on a pedestal portion 116 so as to provide an overhanging shoulder portion 118. The rectangular member 114 is configured to enable insertion of the thumb pad 100, which includes a corresponding aperture therein, over the rectangular member 114 such that the thumb pad 100 is retained by the overhanging shoulder portion 118 engaging a top surface of the thumb pad 100. Thus, during assembly, the thumb pad 100 may be readily snapped into position. In addition, in the preferred embodiment as illustrated in FIGS. 3 through 7, two radiused ridges 119 are provided to engage the downwardly biased ends 120 of the thumb pad 100 such that the locking spindle 66 is releasably retained in either the released or locked position. In addition, although not shown, the thumb pad 100 might be marked with the words "open" and "lock" and/or other suitable indicia indicating when the locking spindle is in the released position and when it is in the locked position. The radiused ridges 119 serve as detents for holding the thumb pad 100 in relation to the rim portion 80 of the connector housings such that the thumb pad 100 can be released by manually applying force to the thumb pad 100 in the direction of travel desired so as to slide the thumb pad 100 across the rim portion. It will be appreciated that numerous other designs for the switch mechanism in keeping with the principles of the present invention might be utilized.

Figure 9:
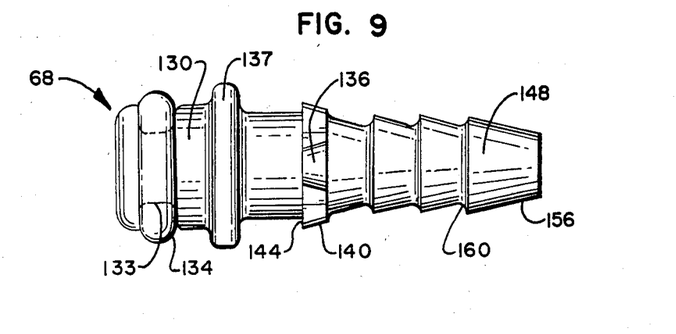
FIG. 9 is a side elevational view of an embodiment of a male tubing insert.
Figure 10:
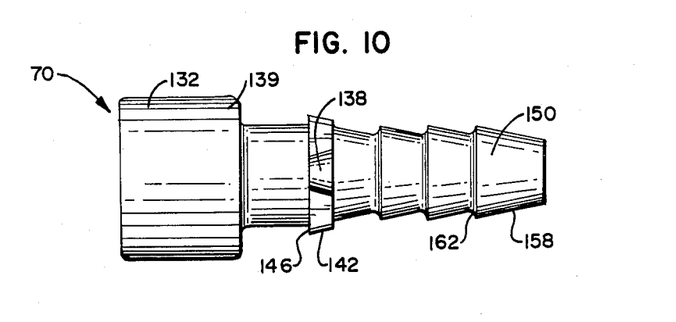
FIG. 10 is a view similar to FIG. 9 of an embodiment of a female tubing insert.

As illustrated in FIGS. 9 and 10, the male tubing insert 68 includes a first end 130 adapted for insertion into a first end 32 of the female tubing insert 70 when the first and second connector housings are in an abutting relationship. The male and female tubing inserts 68, 70 include axially extending bores 129, 131 therethrough so as to define a path for the flow of fluid therethrough. The first end 130 of the male tubing insert 68 includes a groove 133 adapted for receipt of an "O" ring 134 providing for a fluid tight seal between the male and female tubing inserts. In addition, the male and female tubing inserts 68, 70 include spaced apart outwardly projecting portions 136, 137 and 138, 139 respectively, for engaging the transverse wall portion 82 of the housing connector so as to removably retain the inserts in the connector housing. The portions 136, 138 are of only slightly greater diameter than the apertures 67 of the connector housings with one side 140, 142, of the portions 136, 138 being tapered so as to enable insertion of the inserts into the apertures 67 and one side 144, 146 being relatively flat for retaining the inserts in position once so inserted. In the embodiment shown, there are four each of the portions 136, 138 symmetrically disposed about the circumference of the inserts. As further illustrated, the diameter of the male and female inserts 68, 70 between the flange portions 136, 137 and 138, 139 respectively, is somewhat less than that of the aperture 67 such that when snapped into place, the male and female inserts 68, 70 are not rigidly mounted, but rather are capable of rotational movement and limited pivotal and lateral movement within the aperture 67 so as to facilitate alignment of the individual inserts. The "O" ring seals 134 are preferably self-retaining and replaceable.

Figure 11:
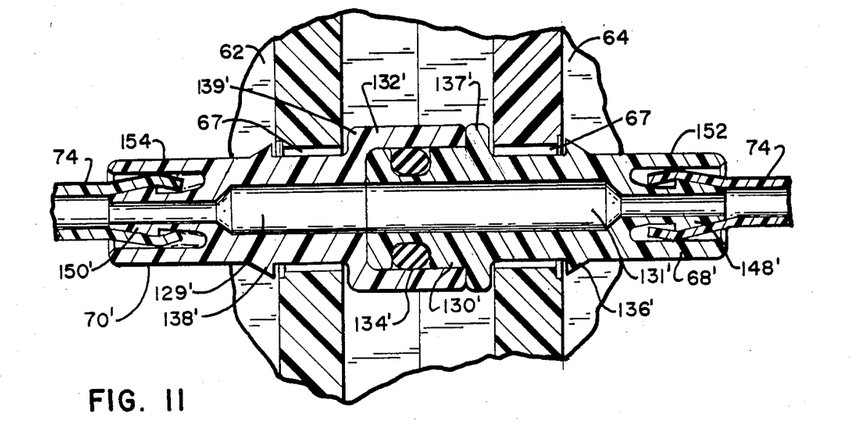
FIG. 11 is an enlarged fragmentary sectional view illustrating interconnection of an alternate embodiment of a male tubing insert to a female tubing insert when the connector housings are in an abutting relationship.

Second ends 148, 150 of the male and female tubing inserts 68, 70 are barbed and configured to be inserted into the end of the tubes 74. The second ends 148, 150 are provided with tapered head portions 156, 158 respectively, which are free of any seam or parting line and which include a radially extending shoulder portion 160, 162 forming a sharp corner for gripping the wall of the tubing. It will be appreciated that while the male and female tubing inserts 68, 70 might be manufactured by any number of methods, a core pin is typically utilized to do away with the seam or part line in the head portions 156, 158. In FIG. 11 wherein alternate embodiments of the male and female tubing inserts 68', 70' are illustrated (primed reference numerals indicating parts corresponding to the embodiments shown in FIGS. 9 and 10) the second ends have been modified to include an axially extending shroud portion 152, 154 radially spaced apart from and circumferentially surrounding the barbed second ends 148', 150'. As illustrated in FIG. 9, the spacing between the shroud portions 152, 154 and the barbed end portions 148', 150' is such that the wall of the tubing fits into this space. This embodiment is particularly advantageous in extremely small tubing such as 1/16th inside diameter tubing. The shroud portions 152, 154 provide support for the barbed ends 148', 150' which otherwise because of their relatively slight size have a tendency to kink or break. Although not shown, the shroud portions 152, 154 might include two diametrically opposed windows or gaps therein to facilitate the molding process.

It will be appreciated that male and female tubing inserts 68, 70 in accordance with the principles of the present invention might be made from varying materials to facilitate use with varying fluids and further might have varying sizes. For example, the male and female tubing inserts 68, 70 might be made of acetalplastic to provide substantial thermal and strength characteristics and average chemical characteristics. On the other hand, the inserts might be made from polypropylene to provide for increased resistance to chemical corrosion. Ideally, the first and second connector housings 62, 64 are made of glass filled nylon so as to provide suitable holding strength.

Figures 12, 13:
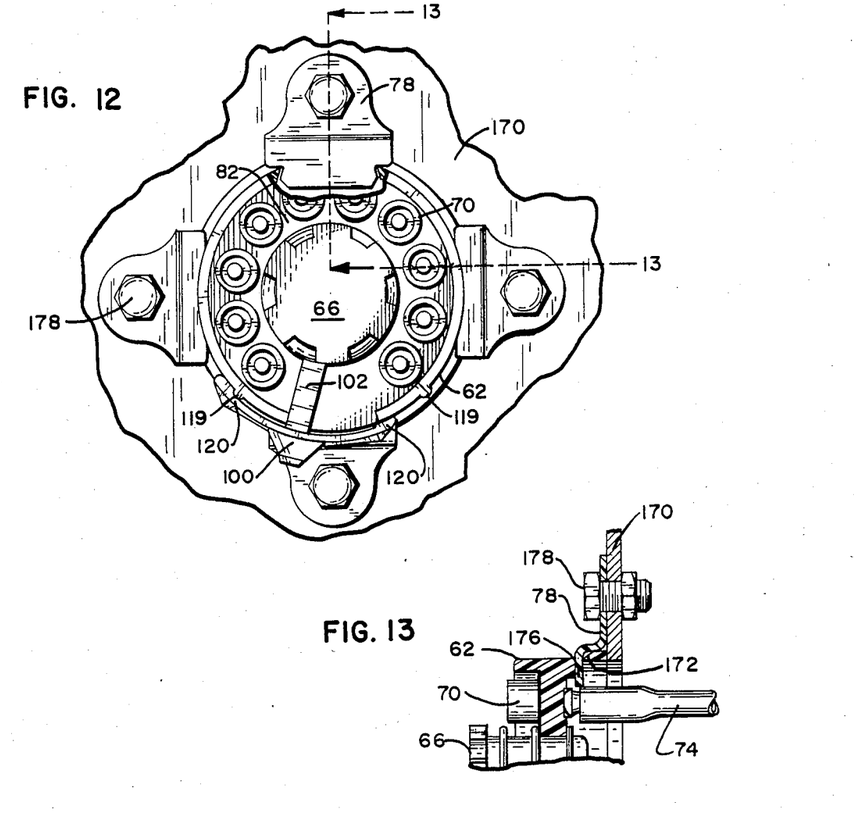
FIG. 12 is an fragmentary elevational view of an embodiment of the connector housing mounted on a panel structure.
FIG. 13 is a sectional view as seen generally along line 13—13 of FIG. 12.

As illustrated in FIG. 3, the multiple tube connector 60 of the present invention might be utilized in a non panel-mounted configuration or, as illustrated in FIGS. 12 and 13, might be utilized in a panel-mounted configuration. As previously discussed, the connector housings 60 are suitably mounted to a panel structure 170 by mounting lugs 78. The rim portion 80 of the connector housings includes an L-shaped flange 172. Diametrically positioned about the circumference of the rim portion are four elongated slots 174 adapted for receipt of an end portion 176 of the mounting lugs 78. As illustrated in FIG. 11, the connector housing is then attached to the panel structure 170 by a threaded fastener 178 inserted through an aperture 180 in the other end of the mounting lug 78.

The slots 174 of the rim portion 80 are also adapted to receive projections 73 of the shroud member 72 such that the shroud member 72 releasably snaps into place.

As illustrated in FIGS. 4, 6 and 7 the locking spindle 66 in connection with the first and second connector housings 62, 64 provides for a connector which is substantially symmetrical about its longitudinal axis such that uniform locking support is provided about the circumference of the connector. This is important in pressurized environments frequently encountered wherein pressures of one hundred p.s.i. are not uncommon. The symmetrical or balanced nature of the connector assures that the connector uniformly distributes the load applied by the internal forces of the tubing pressure.

In use, the first and second connector housings 62, 64 are readily connected and locked in an abutting relationship and disconnected by rotation of the locking spindle 66 a predetermined amount by use of the thumb pad 100. The locking mechanism of the present invention insures a quick positive lock with each use. Furthermore, quick uncoupling is accomplished by movement of the thumb pad 100 to the open position and then pulling the first and second connector housings 62, 64 apart. A particularly advantageous feature of the present invention is that proper keying or alignment is assured through cooperation of the locking spindle 66 with the first and second connector housings 62, 64. In addition, the arrangement of the tubing inserts 68, 70 assures proper balancing of the multiple tube connection. Further, the identical structure of the first and second connector housings 62, 64 reduces manufacturing costs and increases overall flexibility of the multiple tube connector. The male and female tubing inserts 68, 70 may be intermixed and replaced as desired with varying sizes and configurations capable of being used.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A multiple tube connector, comprising:
   (a) a first cylindrical connector housing having an axially extending, outer rim portion interconnected to a transversely extending wall portion, the wall portion having an aperture substantially coaxial with respect to the rim portion, a plurality of apertures of lesser diameter than the coaxial aperture being disposed in the wall portion circumferentially about a major portion of the coaxial aperture, the coaxial aperture including a plurality of inwardly projecting, evenly spaced apart and substantially identical spline members, the spline members defining a plurality of axially extending keyways therebetween;
   (b) a second cylindrical connector housing substantially identical to the first cylindrical connector housing;
   (c) a plurality of axially extending hollow male and female inserts removably positioned in at least some of the apertures of lesser diameter, a first end of the female inserts being adapted to receive a first end of the corresponding male inserts when the first and second connector housings are placed in an abutting relationship, a second end of the male and female inserts being configured for insertion into a tube; and (d) a cylindrical locking spindle being rotatably retained proximate a first end in the first connector housing, the locking spindle defining proximate a second end a plurality of evenly spaced apart, outwardly projecting and substantially identical spline members, axially extending keyways being defined between the spline members, the locking spindle being interconnected by an elongated radially extending shaft to manually activated switch means for rotating the locking spindle between a first released position and a second locked position, the splines of the locking spindle cooperating with the key ways of the second connector housing to enable partial insertion of the locking spindle through the coaxial aperture of the second connector housing so as to place the first and second connector housings in an abutting relationship when in the first released position, the splines of the locking spindle cooperating with the splines of the second connector housing to lock the first and second connector housings together in an abutting relationship when in the second locked position, the rim portions of the first and second connector housings being cut away along a predetermined circumferential extent and the wall portions of the first and second connector housings being void of the apertures of lesser diameter along a corresponding extent to enable a predetermined amount of pivotal motion of the elongated shaft, the elongated shaft and the splines of the locking spindle cooperating with the first and second connector housings to provide a keying feature whereby proper matching of the respective male and female inserts is assured upon positioning of the first and second connector housings in an abutting relationship.

2. A multiple tube connector in accordance with claim 1, wherein the first end of each of the male inserts includes self-retaining, replaceable "O" ring seal means for providing a fluid tight seal with the first end of each of the female inserts.

3. A multiple tube connector in accordance with claim 1, wherein the first and second connector housings and the locking spindle each include six splines separated from one another by substantially thirty degrees, the locking spindles each having a circumferential extent of approximately thirty degrees.

4. A multiple tube connector in accordance with claim 1, wherein the locking spindle is retained in the first connector housing by a snap ring member positioned in a groove of the locking spindle.

5. A multiple tube connector in accordance with claim 1, wherein the locking spindle may be positioned in either of the first and second connector housings.

6. A multiple tube connector in accordance with claim 1, wherein the second end of the male and female inserts includes an axially extending shroud portion radially spaced apart from hollow cylindrical, barbed portion, the shroud portion circumferentially extending about a major portion of the cylindrical barbed portion, the shroud portion and the barbed portion cooperating to enable insertion of a tube wall between the shroud portion and the cylindrical barbed portion.

7. A multiple tube connector in accordance with claim 1, wherein the elongated shaft is interconnected to a thumb pad member slidably engaging the rim portions of the first and second connector housings, the rim portions being provided with raised, radiused ridge means for releasably retaining the thumb pad member in one of an open position corresponding to the first released position of the locking spindle and a closed position corresponding to the second locked position of the locking spindle.

8. A multiple tube connector, comprising:
(a) a first connector housing having a plurality of apertures disposed therein;
(b) a second connector housing having a plurality of apertures disposed therein corresponding to the apertures of the first connector housing;
(c) male insert means and female insert means being removable positioned in corresponding ones of the apertures of the first and second connector housings for defining fluid flow paths for the flow of fluid through the first and second connector housings when the first and second connector housings are placed in an abutting relationship such that the male insert means are interconnected to corresponding ones of the female insert means, the first end of the female insert means being configured for interconnection to a first end of the male insert means, a second end of the male insert means and the female insert means being adapted for interconnection to an open end of a tube;
(d) locking spindle means of lesser diameter than the first connector housing and the second connector housing rotatably mounted in the first connector housing, the locking spindle means including spline and keyway means cooperating with spline and keyway means of the second connector housing for locking the first and second connector housings in an abutting relationship when the locking spindle means is in a locked position wherein corresponding ones of the male insert means and the female insert means are interconnected, and for allowing separation of the first and second connector housings when the locking spindle means is in a released position, the male insert means and the female insert means being positioned radially outwardly of the locking spindle means; and
(e) switch means for rotating the locking spindle means between the locked position and the released position.

9. A multiple tube connector in accordance with claim 8, wherein the first end of the female insert means includes a hollow cylindrical portion adapted to receive a cylindrical portion of the first end of the male insert means, the cylindrical portion of the male insert means including "O" ring seal means about the circumference thereof for providing a fluid tight seal between an outside wall portion of the male insert means and an inside wall portion of the female insert means.

10. A multiple tube connector in accordance with claim 8, wherein the locking spindle means includes keying means cooperating with the first and second connector housings for assuring that corresponding ones of the male and female insert means are properly interconnected with the first and second connector housings are placed in an abutting relationship.

11. A multiple tube connector in accordance with claim 8, wherein the first and second connector housings are substantially identical, the locking spindle means being rotatably mounted in one of the first and second connector housings.

12. A multiple tube connector in accordance with claim 8, wherein the first and second connector housings each comprise a one piece unit.

13. A multiple tube connector in accordance with claim 8, wherein the male and female insert means each comprise a one piece unit, the male and female insert means including flange means for snapping the male and female insert means into place in the apertures of the first and second connector housings.

14. A multiple tube connector in accordance with claim 13, wherein the male and female insert means have a portion with a lesser diameter than the apertures of the first and second connector housings, the portion of lesser diameter cooperating with the apertures when the male and female inserts are snapped into the apertures to provide for limited pivotal movement of the male and female inserts.

15. A multiple tube connector in accordance with claim 8, wherein the second ends of the male and female insert means include a shroud portion circumferentially extending about and radially spaced apart from a barbed, hollow cylindrical portion adapted for insertion into the end of a tube.

16. A multiple tube connector in accordance with claim 8, wherein the locking spindle means and the first and second connector housings are substantially symmetrical on either side of a plane extending through a longitudinal axis of the multiple tube connector so as to provide for an equal number of the apertures on either side of the plane.

17. A multiple tube connector, comprising:
(a) a first connector housing including a plurality of male insert means for defining fluid flow paths through the first connector housing;
(b) a second connector housing including a plurality of female insert means corresponding to the male insert means, a first end of the female insert means including means for receiving a first end of the male insert means, a second end of the male insert means and the female insert means including means for interconnection to a tube;
(c) locking spindle means rotatably mounted in one of the first and second connector housings and including spline and keyway means of the other of the first and second connector housings for locking the first and second connector housings together when rotated to a locked position wherein corresponding ones of the male insert means and the female insert means are interconnected so as to provide fluid flow paths through the first and second connector housings and for allowing separation of the first and second connector housings when in a relased position, the locking spindle means further including keying means for assuring proper interconnection of the corresponding male insert means and female insert means, the male insert means and the female insert means being circumferentially disposed about the locking spindle means; and
(d) switch means for rotating the locking spindle means between the locked position and the released position.

18. A multiple tube connector in accordance with claim 17, wherein the male insert means and female insert means are removably and rotatably mounted in the first and second connector housings.

19. A multiple tube connector in accordance with claim 17, wherein the locking spindle means and the first and second connector housings are substantially symmetrical on either side of a plane extending through a longitudinal axis of the multiple tube connector so as to provide for an equal number of the insert means on either side of the plane.

20. A multiple tube connector in accordance with claim 8, wherein the first and second connector housings and the male and female insert means are made of a plastic material.

21. A multiple tube connector in accordance with claim 1, wherein the first and second connector housings and the male and female inserts are made of a plastic material.

22. A multiple tube connector in accordance with claim 17, wherein the first and second connector housings and the male and female insert means are made of a plastic material.

* * * * *